United States Patent
Kelly et al.

(10) Patent No.: US 8,586,261 B2
(45) Date of Patent: Nov. 19, 2013

(54) TECHNIQUES FOR PACKAGING AND UTILIZING SOLID HYDROGEN-PRODUCING FUEL

(75) Inventors: Michael T. Kelly, Plainsboro, NJ (US); Jeffrey V. Ortega, Camarillo, CA (US)

(73) Assignee: Protonex Technology Corporation, Southborough, MA (US)

(*) Notice: Subject to any disclaimer, the term of this patent is extended or adjusted under 35 U.S.C. 154(b) by 586 days.

(21) Appl. No.: 12/078,034

(22) Filed: Mar. 26, 2008

(65) Prior Publication Data
US 2009/0017348 A1    Jan. 15, 2009

Related U.S. Application Data

(60) Provisional application No. 60/907,232, filed on Mar. 26, 2007.

(51) Int. Cl.
| | |
|---|---|
| H01M 8/00 | (2006.01) |
| H01M 8/06 | (2006.01) |
| H01M 8/22 | (2006.01) |
| C10L 5/00 | (2006.01) |
| B23P 17/00 | (2006.01) |
| B65D 21/02 | (2006.01) |

(52) U.S. Cl.
USPC ........... 429/515; 429/507; 429/505; 429/513; 429/426; 429/416; 29/422; 44/629; 220/23.83; 220/367.1; 264/239

(58) Field of Classification Search
USPC ............. 429/20, 22, 429, 428, 430, 515, 507, 429/505, 513, 426, 416; 48/61; 222/3; 422/198; 29/422; 44/629; 220/23.83, 220/367.1; 264/239
See application file for complete search history.

(56) References Cited

U.S. PATENT DOCUMENTS

| | | | |
|---|---|---|---|
| 3,459,510 | A | 8/1969 | Litz et al. |
| 5,372,617 | A | 12/1994 | Kerrebrock et al. |
| 5,728,464 | A | 3/1998 | Checketts |
| 7,105,033 | B2 | 9/2006 | Strizki et al. |
| 7,128,997 | B2 | 10/2006 | Harding et al. |
| 7,189,382 | B2 | 3/2007 | Grigorian |
| 7,214,439 | B2 | 5/2007 | Ortega et al. |
| 7,250,232 | B2 | 7/2007 | Boysen et al. |
| 7,641,889 | B1 | 1/2010 | Salinas et al. |
| 7,651,542 | B2 | 1/2010 | Shurtleff et al. |
| 7,674,540 | B2 | 3/2010 | Adams et al. |
| 7,727,293 | B2 | 6/2010 | Rosenzweig et al. |
| 2002/0088178 | A1 | 7/2002 | Davis |
| 2003/0003341 | A1* | 1/2003 | Kinkelaar et al. .............. 429/34 |

(Continued)

OTHER PUBLICATIONS

"Thermal Management for IC/PCB/LED", Online PR News, retrieved online on Aug. 18, 2010 from: http://www.onlineprnews.com/news/41450-1276695645-thermal-management-for-icpcbled.html.*

*Primary Examiner* — Kenneth Douyette
(74) *Attorney, Agent, or Firm* — Edwards Wildman Palmer LLP; Christine C. O'Day; George N. Chaclas (57) ABSTRACT

Techniques for packaging and utilizing solid hydrogen-producing fuel are described herein. The fuel may be in the form of a bonded/compressed powder, granules, or pellets. The fuel is packaged in cartridges having hydrogen-permeable enclosures. In operation, the fuel undergoes a hydrogen-releasing Thermally Initiated Hydrolysis (TIH) reaction. A cartridge may comprise one or more fuel chambers, and several cartridges may be assembled together.

55 Claims, 6 Drawing Sheets

(56) References Cited

U.S. PATENT DOCUMENTS

| | | |
|---|---|---|
| 2003/0162059 A1 | 8/2003 | Gelsey |
| 2004/0016769 A1* | 1/2004 | Redmond .................. 222/3 |
| 2004/0047801 A1 | 3/2004 | Petillo et al. |
| 2004/0214056 A1* | 10/2004 | Gore ...................... 429/20 |
| 2005/0036941 A1 | 2/2005 | Bae et al. |
| 2005/0142404 A1* | 6/2005 | Boucher et al. ........... 429/20 |
| 2005/0191234 A1 | 9/2005 | Mertens et al. |
| 2005/0238573 A1 | 10/2005 | Zhang et al. |
| 2006/0191198 A1* | 8/2006 | Rosenzweig et al. ........ 48/61 |
| 2006/0191199 A1* | 8/2006 | Rosenzweig et al. ........ 48/61 |
| 2006/0196112 A1 | 9/2006 | Berry et al. |
| 2006/0269470 A1 | 11/2006 | Zhang et al. |
| 2007/0062115 A1 | 3/2007 | Berry et al. |
| 2007/0068071 A1 | 3/2007 | Kelly et al. |
| 2007/0084115 A1 | 4/2007 | Berry et al. |
| 2007/0271844 A1 | 11/2007 | Mohring et al. |
| 2008/0172932 A1 | 7/2008 | Kelly et al. |
| 2008/0236032 A1 | 10/2008 | Kelly et al. |
| 2008/0241613 A1 | 10/2008 | Kelly et al. |

* cited by examiner

TECHNIQUES FOR PACKAGING AND UTILIZING SOLID HYDROGEN-PRODUCING FUEL

CROSS-REFERENCE TO RELATED APPLICATIONS

This application claims benefit of U.S. Provisional Patent Application Ser. No. 60/907,232, filed on Mar. 26, 2007, which is herein incorporated by reference.

BACKGROUND OF THE INVENTION

The present invention relates generally to electrochemical electrical systems and, in particular, to techniques for packaging and utilizing solid hydrogen-producing fuel.

In electrochemical electrical systems (usually, including a fuel cell), hydrogen and ambient air are used to generate electrical energy. In many applications and, in particular, for powering portable devices (for example, cellular phones, laptop computers, video cameras, consumer telecommunications equipment, etc.) the portability and gravimetric efficiency of an electrochemical electrical system is an important and, sometimes, dominating technical parameter.

High hydrogen output and extended duration of run time have been achieved in the systems using solid-state fuel comprising materials that, in operation, release hydrogen via a heat-initiated chemical reaction referred to herein as Thermally Initiated Hydrolysis (TIH).

U.S. Patent Application Publication No. 2005/0142404 A1 to Boucher et al. describes an arrangement where hydrogen-producing solid fuel elements are disposed in gas-tight compartments.

U.S. Patent Application Publication No. 2008/0035252 A1 to Mallery et al. describes encasements adapted for storing solid fuel and fabricated from gas-tight materials.

However, in many electrochemical electrical systems, such techniques for packaging and utilizing solid hydrogen-producing fuel are operationally inefficient and, consequently, further improvements are desirable.

SUMMARY OF THE INVENTION

Techniques are disclosed for packaging and utilizing solid hydrogen-producing fuel, which may be in the form of a powder, granules, or pre-fabricated pellets. In operation, the fuel undergoes a Thermally Initiated Hydrolysis (TIH) reaction resulting in generation of a gas that includes hydrogen. The fuel is packaged in cartridges having hydrogen-permeable enclosures and allowing thermo-conductive coupling between the fuel and initiators of the TIH reaction. A cartridge may comprise one or more fuel chambers separated from one another by inner sidewalls of the enclosure, and several fuel cartridges may be assembled together to form a fuel cassette.

Various other aspects and embodiments of the invention are described in further detail below.

The Summary is neither intended nor should it be construed as being representative of the full extent and scope of the present invention; these and additional aspects will become more readily apparent from the detailed description, particularly when taken together with the appended drawings.

To facilitate understanding, identical reference numerals have been used, where possible, to designate identical elements that are common to the figures, except that suffixes may be added, when appropriate, to differentiate such elements. The images in the drawings are simplified for illustrative purposes and are not necessarily depicted to scale.

The appended drawings illustrate exemplary configurations of the invention and, as such, should not be considered as limiting the scope of the invention. Correspondingly, it has been contemplated that features of some configurations may beneficially be incorporated in other configurations without further recitation.

DETAILED DESCRIPTION OF THE INVENTION

The word "exemplary" is used herein to mean "serving as an example, instance, or illustration." Any configuration or design described herein as "exemplary" is not necessarily to be construed as preferred or advantageous over other configurations or designs.

The techniques described herein may be used for fabricating fuel cartridges that, upon thermal initiation and consequent decomposition of solid fuel contained therein, release a gas of particular interest. An exemplary use of these techniques for packaging and utilization of solid hydrogen-producing fuel consumed in fuel cells of electrochemical electrical systems is described below.

In one embodiment, the fuel comprises at least one fuel material that, upon thermal initiation, undergoes a self-sustaining reaction referred to herein as Thermally Initiated Hydrolysis (TIH) and resulting in the generation of a gas including hydrogen. Some of such fuel materials are described in commonly assigned U.S. patent application Ser. No. 11/524,446, filed Sep. 21, 2006. Herein, such fuel materials are referred to as TIH materials. A TIH material may include (i) hydrides, ionic hydride salts, aluminum hydrides, or a combination thereof, and (ii) water surrogate sources such as carbohydrates, allylic alcohols, polymers, hydrated salts or bicarbonate salts, and hydroxide compounds including lithium hydroxide, boron hydroxide, and aluminum hydroxide, or a combination thereof, among or in addition to other TIH-compatible fuel materials. In the TIH material, it is preferable that the molar equivalent quantity of hydride material exceeds the molar equivalent quantity of water-surrogate material.

With reference to the drawings, and in particular to FIGS. 1A-1F, there is shown a block diagram of an exemplary electrochemical electrical system 100 incorporating features of the present invention. In particular, the system 100 includes a fuel cell (i.e., electro-chemical reactor) 110, a fuel compartment 120, a gas conduit 140 including an optional gas regulator 142, and a controller 150 administering operations in the system 100. The fuel compartment 120 generally comprises a housing 122 having an outlet gas port 136, at least one substrate 126 (for example, printed circuit board (PCB)), and a plurality of N fuel cartridges 124 disposed on the substrate(s) 126.

Figure 1:
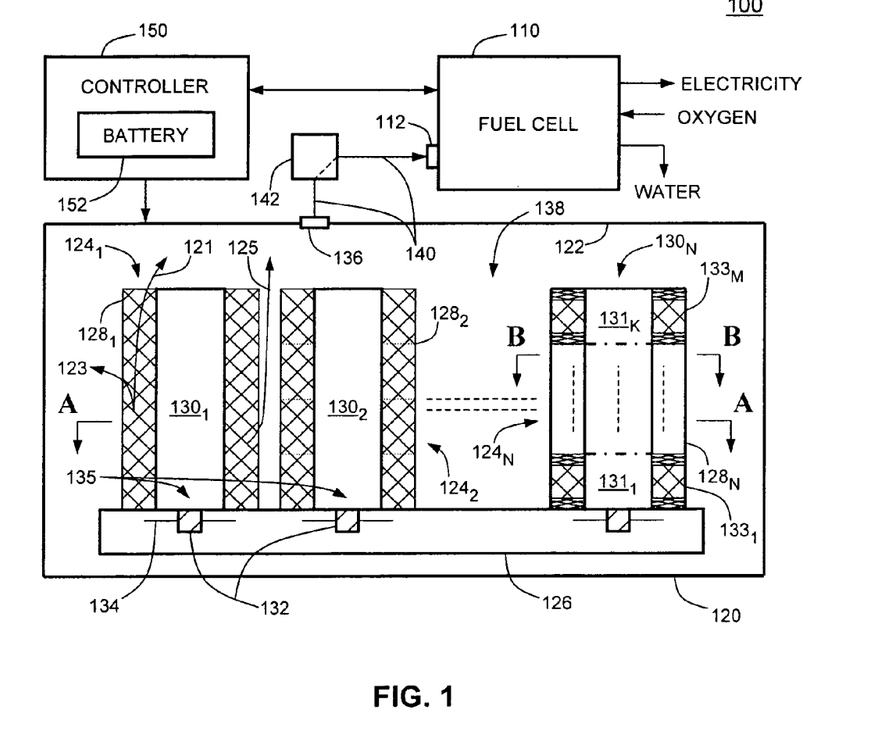
FIG. 1 depicts a high-level functional block diagram of an exemplary electrochemical electrical system incorporating features of one embodiment of the present invention.

Each cartridge 124 includes a gas-permeable enclosure 128 fabricated from a heat resistant material(s) and a fuel core 130 disposed in the enclosure 128 and comprising one or more TIH materials. In the core 130, the TIH materials may be in a bonded/compressed powder form, a granular form, a single/multiple pellet form, or a combination thereof.

Figure 2A:
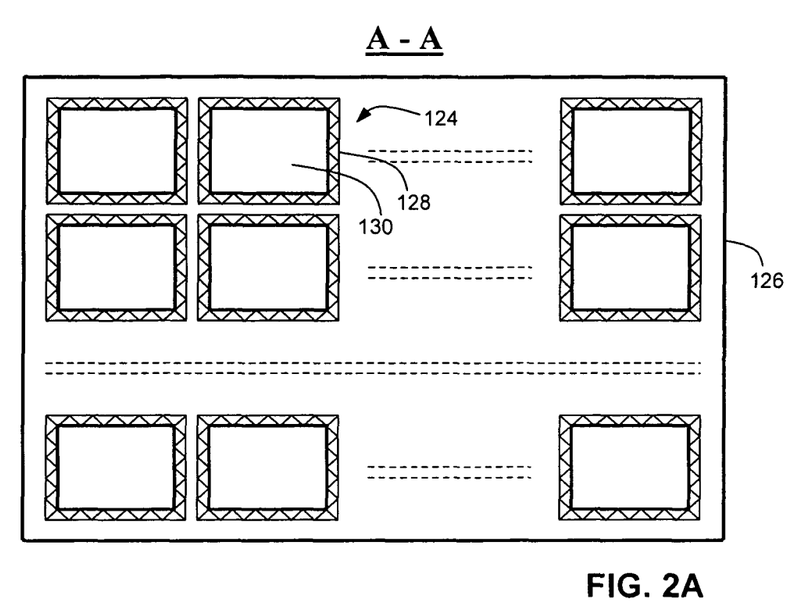
FIGS. 2A-2B depict exemplary cross-sectional views of fuel cartridges shown in FIG. 1.
Figure 2B:
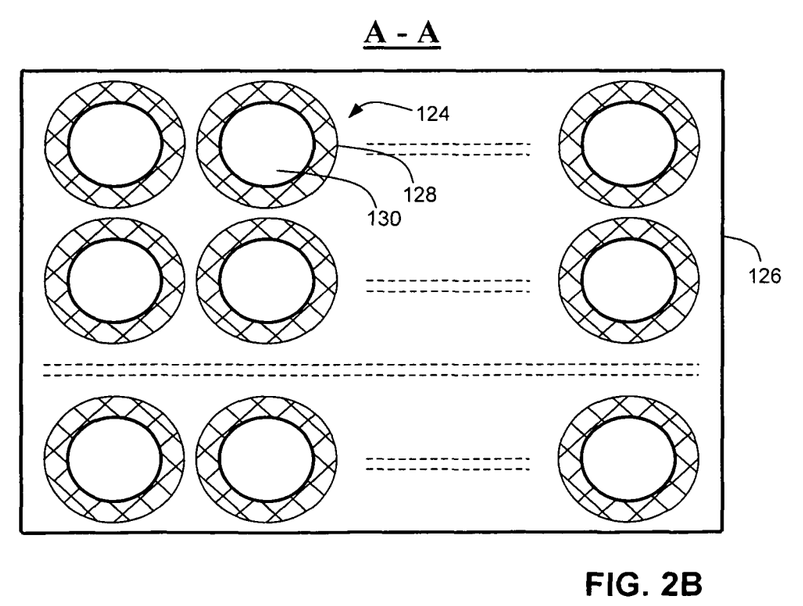

Suitable materials for the enclosure 128 include ceramics, metals, glasses, vermiculite coated fiberglass, thermoplastics, and combinations thereof. Such materials may naturally be sufficiently porous to gas (as shown in FIG. 1) or, alternatively, sidewalls of the enclosure 128 may comprise channels or openings for the gas escaping from the interior of the cartridge 124. In a cross-sectional view, the enclosure 128 may have different configurations and, for example, utilize a form factor of a rectangle, a square, a circle or an oval, a hexagon, or a triangle. On the substrate 126, the cartridges 124 may be disposed in a plurality of pre-selected patterns, for example, in grid patterns shown for rectangular and circular cartridges 124 in FIGS. 2A-2B, in which cross-sectional views are taken along a line A-A in FIG. 1.

The substrate 126 comprises a plurality of initiators 132 of the TIH materials of the cores 130 and is generally fabricated from thermo-resistant materials, for example, materials comprising woven fiberglass or phenolic resins as principal components. Suitable materials for the substrate 126 include epoxy resin bonded glass fabric (ERBGF) compounds (e.g., an industry-standard laminate "Flame Retardant 4" (FR-4), and the like) or phenolic resins laminated with glass fibers (rigid substrate 126), as well as composites such as Pyralux™ or Nikaflex™ (both are available from DuPont, Wilmington, Del.) or similar materials (flexible substrate 126).

In one embodiment, the initiators 132 are heat sources, such as electric resistive, pyrotechnic, or arc discharge heat-producing elements. Via wiring 134 of the substrate 126, the initiators 132 are controllably connected to a source of energy, such as a depleteable (primary) or, alternatively, rechargeable (secondary) battery 152.

Within the substrate 126, the initiators 132 are disposed in a manner providing thermo-conductive coupling thereof to bottom portions 135 of the cores 130 of the fuel cartridges 124. In one embodiment, in operation, the battery 152 energizes the initiators 132 in an order pre-determined by the controller 150, and the energized initiator 132 activates the TIH reaction in the core 130 of the cartridge 124 disposed proximate to that initiator.

In the depicted embodiment, the battery 152 may be disposed in a portion of the controller 150, however, in other embodiments, the battery 152 may be disposed in a portion of the fuel compartment 120 or as a stand-alone device. In one particular embodiment, the electricity generated by the fuel cell 110 is used to charge a rechargeable battery 152.

In some embodiments, at least a portion of the cores 130 may be composed of a plurality of fuel pellets 131, which are stacked within the enclosure 128 (K pellets 131 are shown in outline in the cartridge $124_N$ only). In this embodiment, the energized initiator 132 activates the TIH reaction in the bottom pellet $131_1$, and then the TIH reaction gradually extends into other pellets of the multi-pellet core $130_N$.

The enclosure 128 may be fabricated from one or several gas-permeable materials (shown in the cartridges $124_1$, $124_2$) or, alternatively, include insets fabricated from such materials and embedded in non-permeable portions of the respective enclosure (M circular insets 133 are shown in the enclosure $128_N$ of the cartridges $124_N$).

In operation, hydrogen produced by the TIH reaction propagates through sidewalls of the gas-permeable enclosure 128 (shown with arrow 121) and gaps between the adjacent cartridges 124 (shown with arrow 123) or between the cartridges 124 and sidewalls of the housing 122 (shown with arrow 125) and accumulates in an upper portion 138 of the housing 122. In alternate embodiments, some of the passages shown with the arrow 121, 123, and 125 may only be partially available to the hydrogen produced in the cartridge 124 wherein the TIH reaction has been activated.

Hydrogen is provided to the fuel cell 110 via the gas conduit 140, which fluidically couples the outlet gas port 136 of the housing 120 to an inlet gas port 112 of the fuel cell 110. In the depicted embodiment, the gas conduit 140 includes the optional gas regulator 142 of a flow rate and/or a temperature of the hydrogen being delivered to the fuel cell 110.

Hydrogen produced via the TIH reaction is sometimes accompanied by small amounts of gases such as carbon oxides (e.g., CO and $CO_2$) and/or amines (e.g., $NH_3$), and removal of these gases would be beneficial to the operational performance of the fuel cell 100. Additionally or alternatively, the gas regulator 142 may comprise components composed of materials that are selectively permeable to hydrogen or suitable for separating hydrogen from other gases released by the fuel during the TIH reaction (e.g., for filtering out the carbon oxides and amines). For example, the gas regulator 142 may have membranes fabricated from palladium, metal hydrides, silicon, silicon-based polymers, and the like hydrogen-permeable materials.

Fuel cartridges of the present invention may be fabricated as stand-alone devices each having a single core 130 as, for example, the cartridges 124 shown in FIG. 1. Alternatively, a plurality of independently activatable cores 130 may be embedded selectively in chambers of a monolithic multi-chamber enclosure fabricated from thermo-resistant and gas-permeable material(s) discussed above in reference to FIG. 1. When mounted on the substrate 126, each core of such a multi-chamber fuel cartridge is thermo-conductively coupled to a respective initiator 132 and may be activated independently from other cores of the same or other cartridges.

Additionally or alternatively, the single-core and multi-core fuel cartridges may be provided with resident and/or detachable elements designed for protecting the TIH materials therein from exposure to moisture or contaminants.

In FIGS. 3A-3F, 4A-4D, and 5A-5D illustrating these and other embodiments of such fuel cartridges, cross-sectional views are illustratively taken in the directions of lines A-A and B-B in FIG. 1, however, the respective cross-sectional views correspond to alternative embodiments of the fuel cartridges 124. For a purpose of graphical clarity and consistency, the depicted cartridges are shown as being disposed on the substrate 126 in the fuel compartment 110.

Figure 3A:
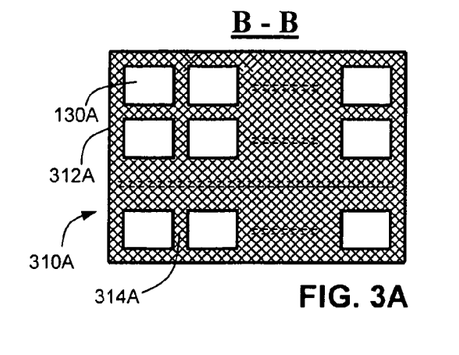
FIGS. 3A-3F depict cross-sectional views of fuel cartridges and fuel cassettes according to alternate embodiments of the present invention.
Figure 3B:
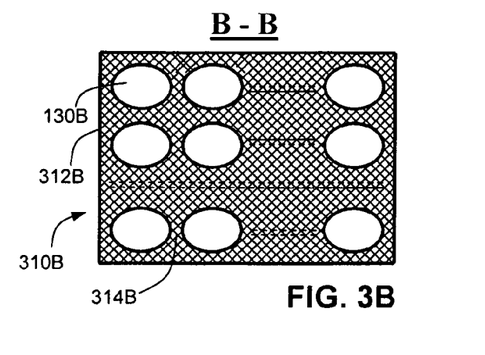
Figure 3C:
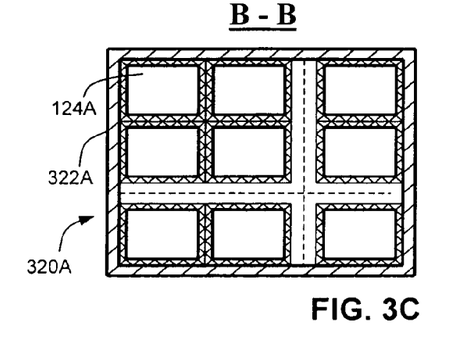
Figure 3D:
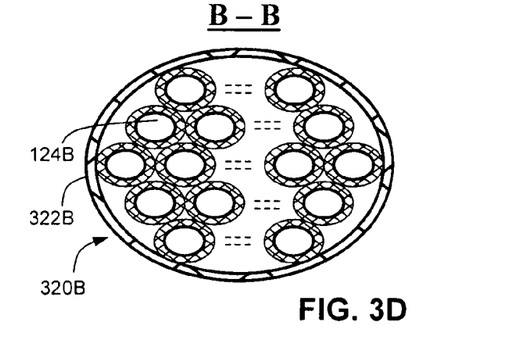
Figure 3E:
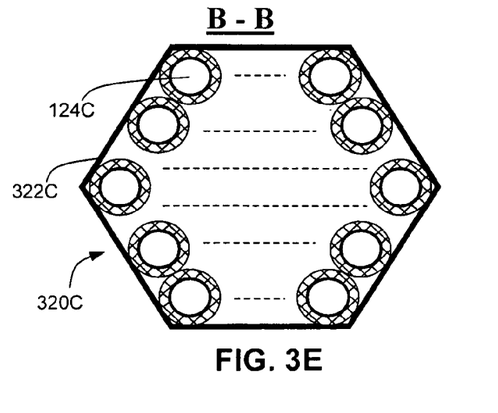
Figure 3F:
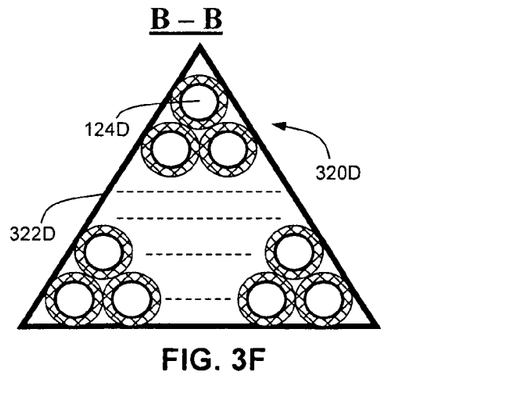
Figure 4A:
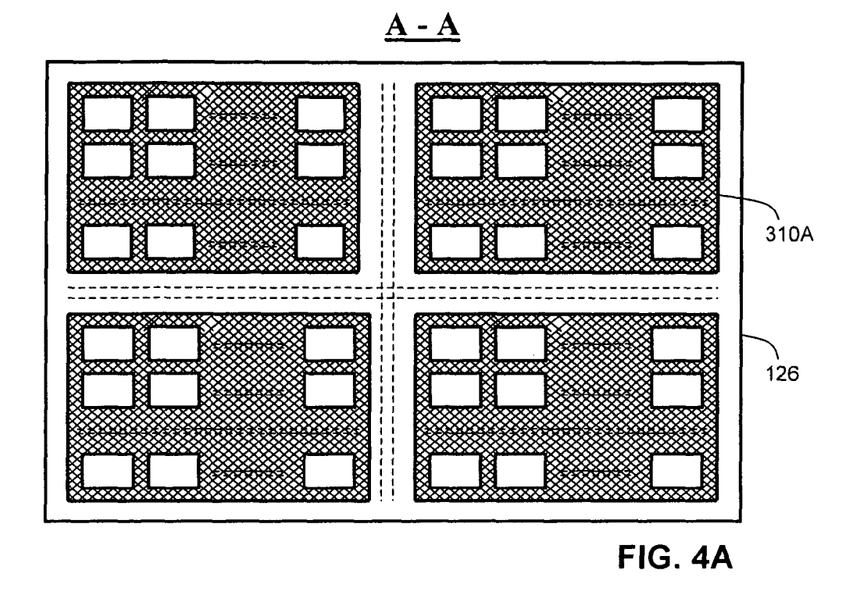
FIGS. 4A-4D illustrate exemplary applications of the fuel cartridges and fuel cassettes of FIGS. 3A-3F.
Figure 4B:
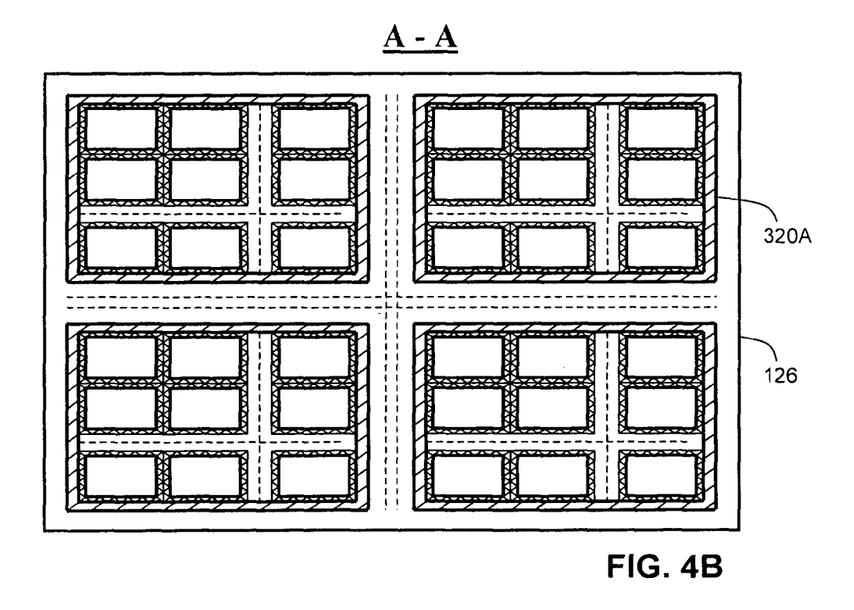
Figure 4C:
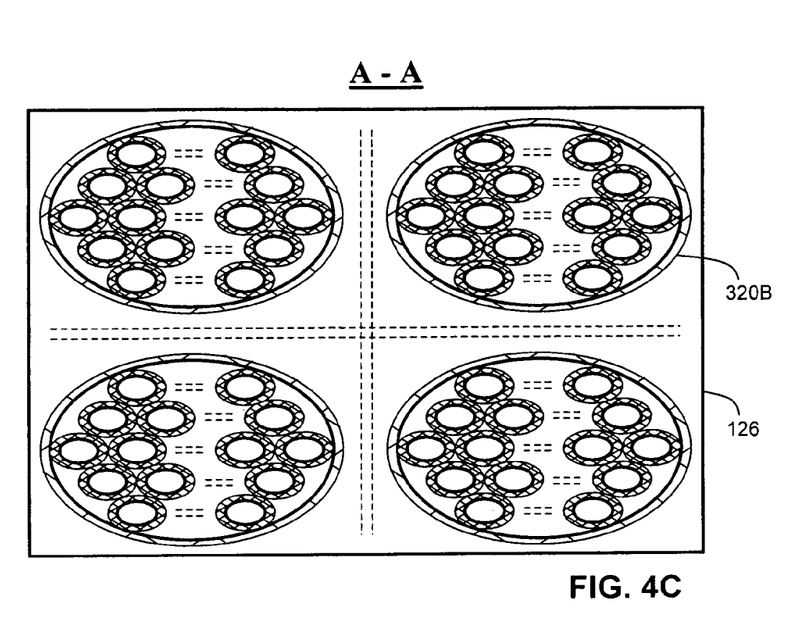
Figure 4D:
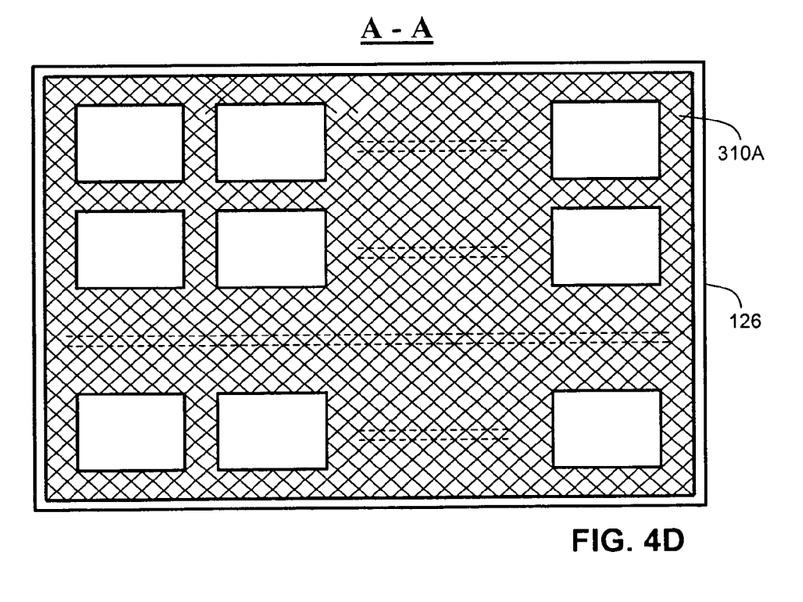

Referring to FIGS. 3A-3B, the fuel cartridges 310 may comprise a plurality of cores 130 (rectangular (FIG. 3A) and oval (FIG. 3B) cores 130 are shown). The cores 130 are disposed in individual chambers formed within a monolithic enclosure 312, which are isolated and thermally separated from one another by internal sidewalls 314 of the enclosure. The enclosure 312 may be fabricated from the same materials as discussed above in reference to the enclosures 128 of the fuel cartridges 124. Each core 130 is associated with a particular initiator 132 of the TIH reaction and operable independently from other fuel cores of the same or other cartridge 310.

Referring to FIGS. 3C-3F, a plurality of the fuel cartridges 124 may be aggregated (i.e., assembled together) to form a multi-initiatable fuel cassette 320. In the cassette 320, the component cartridges 124 may be aggregated using one or more structural elements that assure mechanical integrity of the fuel cassette. In the depicted embodiments, the cassettes 320 illustratively include shells 322 at least partially encompassing the component cartridges 124 thereof, and other suitable structural elements may be envisioned by those skilled in the art.

The fuel cassette 320 may be fabricated with different cross-sectional configurations and/or comprise fuel cartridges 124 having cores 130 with different form factors. For example, the fuel cassette 320 may have rectangular (FIG. 3C), circular/oval (FIG. 3D), hexagonal (FIG. 3E), and triangular (FIG. 3F) configurations (i.e., form factors). In operation, each component fuel cartridge 124 of the fuel cassette 320 is associated with a particular initiator 132 of the TIH reaction and may be activated independently from other fuel cartridge 124 of the same or other cassette 320.

Referring to FIGS. 4A-4D, fuel cartridges 310 (FIG. 4A) and fuel cassettes 320 (FIGS. 4B-4C) may be mounted on the substrate 126 and, in operation, release hydrogen to the fuel cell 110 of the system 100. The fuel cartridges 310 and component cartridges 124 of the fuel cassettes 320 are provided with individual initiators of the TIH reaction in the respective cores 130 and may be activated selectively by the controller 150. In some embodiments, the substrate 126 may include a single custom-sized fuel cartridge 310 (shown in FIG. 4D) or, alternatively, a single custom-sized fuel cassette 320.

In some embodiments, the fuel cartridges 124, 310 and fuel cassettes 320 may include optional elements, which protect the TIH material(s) of the cores 130 from exposure to moisture or contaminants, as illustratively shown for cartridges 310A in FIGS. 5A-5D.

Figure 5A:
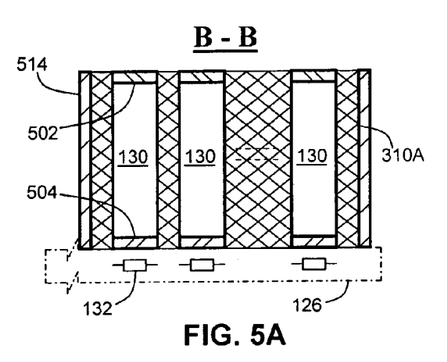
FIGS. 5A-5D illustrate optional embodiments of the fuel cartridges of FIGS. 2A-2B and 3A-3F.
Figure 5B:
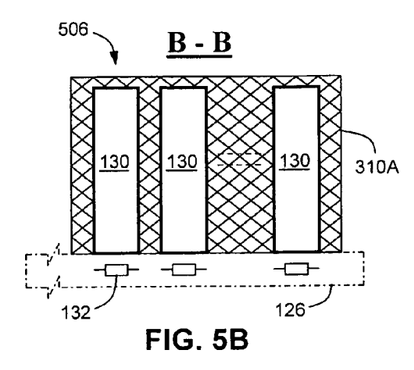
Figure 5C:
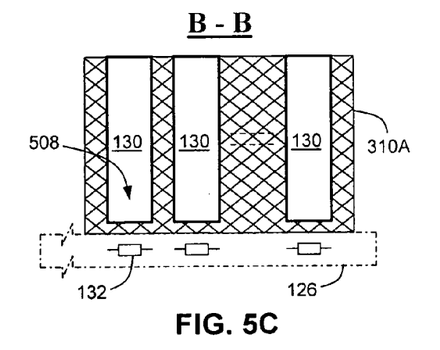
Figure 5D:
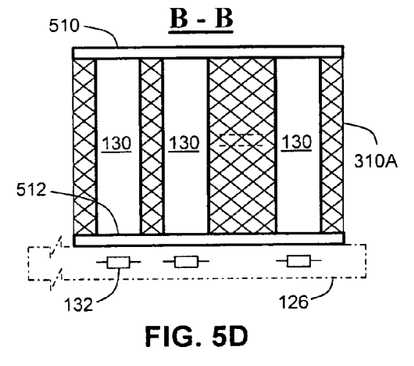

Referring to FIG. 5A, the cores 130 may be provided with at least one of a top and/or a bottom cover 502, 504 and a sidewall cover 514. Such covers may be permanently (as shown) or detachably coupled to the cartridge 310A. Referring to FIGS. 5B-5D, a cartridge may comprise a lid portion 506 or a bottom portion 508 integrated with sidewalls of the cartridge 310A and providing protection to all the cores therein (FIGS. 5B-5C) or, alternatively, be provided with at least one of top or bottom covers 510, 512 (FIG. 5D). The covers 502 and 510 are fabricated from thermo-resistant and, preferably, gas-permeable materials, whereas the covers 504 and 512 are fabricated from thermo-conductive materials with a thickness facilitating selective activation of the cores 130 of the cartridge 310A. Correspondingly, a thickness of the portion 508 is also chosen to provide selective activation of the cores 130, and the sidewall cover 514 is generally fabricated from a hydrophobic material.

Although the invention herein has been described with reference to particular illustrative embodiments, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. A fuel cartridge comprising a hydrogen-permeable enclosure, a solid fuel core that produces hydrogen via a Thermally Initiated Hydrolysis (TIH) reaction contained within the enclosure,
wherein said solid fuel core comprises an intimate mixture of all chemical reagents necessary to undergo a TIH reaction.

2. The fuel cartridge of claim 1, wherein the enclosure comprises side-walls with portions thereof fabricated from a porous material.

3. The fuel cartridge of claim 1, wherein the enclosure comprises at least one side-wall with portions thereof fabricated from a ceramic, a glass, a vermiculite coated fiberglass, a polymer, a plastic, a metal, or a combination thereof.

4. The fuel cartridge of claim 1, wherein the enclosure comprises gas openings passing there through.

5. The fuel cartridge of claim 1, wherein the enclosure is fabricated from a heat-resistant material.

6. The fuel cartridge of claim 1, wherein, in a cross-sectional view, the enclosure has a form factor comprising one of a rectangle, a square, a circle, an oval, a hexagon, and a triangle.

7. The fuel cartridge of claim 1, wherein the enclosure comprises gas permeable side-walls and a thermo-resistant and gas permeable top cover formed integral with the side-walls.

8. The fuel cartridge of claim 1, wherein the solid fuel core comprises (i) boron hydrides, ionic hydride salts, aluminum hydrides, or a combination thereof, and (ii) carbohydrates, allylic alcohols, polymers, hydrated salts, bicarbonate salts, hydroxide compounds including lithium hydroxide, boron hydroxide, and aluminum hydroxide, or a combination thereof.

9. The fuel cartridge of claim 7, further comprising a thermally conductive bottom cover.

10. The fuel cartridge of claim 1, wherein the solid fuel core comprises a hydride material and a water-surrogate material with a molar equivalent of the hydride material in excess of the molar equivalent of the water-surrogate material.

11. The fuel cartridge of claim 1, wherein the solid fuel core is formulated to undergo a self-sustaining reaction and consequent decomposition of all of the solid fuel contained therein in response to thermal initiation.

12. The fuel cell cartridge of claim 1 wherein the solid fuel core comprises a predetermined amount of solid fuel which upon thermal initiation causes fuel materials completely contained with the solid fuel core to generate hydrogen gas by self-sustaining Thermally Initiated Hydrolysis (TIH) until consequent decomposition of the solid fuel.

13. A fuel cartridge comprising a hydrogen-permeable enclosure, a solid fuel core that produces hydrogen via a Thermally Initiated Hydrolysis (TIH) reaction contained within the enclosure,
wherein said solid fuel core comprises a solid hydride material and a solid water surrogate source material and has the physical form of bonded/compressed powder, granules, single/multiple pellets, or a combination thereof.

14. A fuel cassette, comprising:
a plurality of individual fuel cartridges, each cartridge comprising a hydrogen-permeable enclosure and a solid fuel core that produces hydrogen via a Thermally Initiated Hydrolysis (TIH) reaction contained within the enclosure; and
at least one structural element aggregating the plurality of fuel cartridges together,
wherein said solid fuel cores each comprise an intimate mixture of all chemical reagents necessary to undergo a TIH reaction.

15. The fuel cassette of claim 14, wherein, in a cross-sectional view, said fuel cassette has a form factor of one of a rectangle, a square, a circle, an oval, a hexagon, and a triangle.

16. The fuel cassette of claim 14, wherein a monolithic element fabricated from a gas permeable material comprises the structural element and wherein a plurality of chambers formed within the monolithic element for receiving a solid fuel core therein comprise the plurality of individual fuel cartridges.

17. The fuel cassette of claim 14, further comprising at least one component protecting the fuel from moisture or contaminants.

18. The fuel cassette of claim 14, wherein each hydrogen permeable enclosure comprises at least one side-wall with portions thereof fabricated from a porous material.

19. The fuel cassette of claim 14, wherein each hydrogen permeable enclosure comprises at least one side-wall with portions thereof fabricated from a ceramic, a glass, a vermiculite coated fiberglass, a polymer, a plastic, a metal, or a combination thereof.

20. The fuel cassette of claim 14, wherein each hydrogen permeable enclosure comprises gas openings passing therethrough.

21. The fuel cassette of claim 14, wherein each hydrogen permeable enclosure is fabricated from a heat-resistant material.

22. The fuel cassette of claim 14, wherein, in a cross-sectional view, each hydrogen permeable enclosure has a form factor of one of a rectangle, a square, a circle, an oval, a hexagon, and a triangle.

23. The fuel cassette of claim 14, further comprising at least one of a moisture resistant top cover, bottom cover and side-wall cover coupled to corresponding exterior surfaces of the structural element.

24. The fuel cassette of claim 14, wherein each intimate mixture is in the form of bonded/compressed powder, granules, single/multiple pellets, or a combination thereof.

25. The fuel cassette of claim 14, wherein each intimate mixture comprises at least one of (i) a boron hydride, an ionic hydride salt, an aluminum hydride, and a combination thereof, and at least one of (ii) a carbohydrate, an allylic alcohol, a polymer, a hydrated salt, a bicarbonate salt, a hydroxide compound a lithium hydroxide, a boron hydroxide, and an aluminum hydroxide, or a combination thereof.

26. The fuel cassette of claim 14, further comprising a different and separately controllable thermal initiator associated with each of the plurality of individual fuel cartridges.

27. The fuel cassette of claim 14, wherein each of the solid fuel cores comprises a substantially identical hydride material and a water-surrogate material with a molar equivalent of the hydride material in excess of the molar equivalent of the water-surrogate material.

28. The fuel cartridge of claim 14, wherein each of the solid fuel cores is formulated to undergo a self-sustaining reaction in response to thermal initiation and wherein the structural element is configured to prevent thermal initiation of cassettes except by thermal initiation by a controllable thermal initiator associated with the cassette.

29. The fuel cassette of claim 26, wherein the cassette further compromises a thermally conductive bottom cover disposed between each of the plurality of enclosures and the thermal initiator associated therewith.

30. An electrochemical electrical system, comprising:
a fuel cell using hydrogen and oxygen to generate electricity;
a controller administering operations in the system; and
a fuel compartment fluidly coupled to the fuel cell and including:
at least one fuel cartridge having a hydrogen-permeable enclosure, a solid fuel core that produces hydrogen via a Thermally Initiated Hydrolysis (TIH) reaction contained within the fuel cartridge; and
a substrate for supporting the fuel cartridge thereon in thermal communication with a thermal initiator that is in electrical communication with the controller for initiating the TIH reaction;
wherein said solid fuel cores each comprise an intimate mixture of all chemical reagents necessary to undergo a TIH reaction.

31. The system of claim 30, wherein the system includes a plurality of fuel cartridges and the controller energizes the thermal initiators in a pre-determined order.

32. The system of claim 30, wherein the controller operates an electric battery energizing at least a portion of the initiators.

33. The system of claim 30, wherein the fuel compartment is coupled to the fuel cell via a regulator of a gas flow rate or a gas temperature.

34. The system of claim 33, wherein the regulator is further configured to separate hydrogen from other gases released by the fuel during the TIH reaction.

35. The system of claim 30, wherein the substrate is fabricated from material comprising woven fiberglass or phenolic resin.

36. The system of claim 30, wherein, the fuel compartment encloses a plurality of fuel cartridges and wherein, in a cross-sectional view each fuel cartridge has a form factor of one of a rectangle, a square, a circle, an oval, a hexagon, and a triangle.

37. The system of claim 30, wherein the enclosure comprises at least one side-wall portions thereof fabricated from a ceramic, a glass, a vermiculite coated fiberglass, a polymer, a plastic, a metal, or a combination thereof.

38. The system of claim 30, wherein the fuel compartment encloses a plurality of fuel cartridges further comprising one or more cassettes comprising a structural element for aggregating two or more cartridges.

39. The system of claim 30, wherein the enclosure is configured provide thermo-conductive coupling between the fuel and the thermal initiator.

40. The system of claim 30, wherein each intimate mixture is in the form of bonded/compressed powder, granules, a single/multiple pellets, or a combination thereof.

41. The system of claim 30, wherein each intimate mixture comprises (i) boron hydrides, ionic hydride salts, aluminum hydrides, or a combination thereof, and (ii) carbohydrates, allylic alcohols, polymers, hydrated salts, bicarbonate salts, hydroxide compounds including lithium hydroxide, boron hydroxide, and aluminum hydroxide, or a combination thereof.

42. The system of claim 30, further comprising at least one fuel cassette comprising a plurality of the fuel cartridges aggregated together by a structural element.

43. The system of claim 38, wherein the structural element comprises a monolithic element fabricated from a gas permeable material and wherein a plurality of chambers formed within the monolithic element for receiving a solid fuel core therein comprise a plurality of individual fuel cartridges with said chambers separated from one another by internal side-walls of the structural element.

44. The system of claim 38, further comprising moisture resistant elements coupled to exterior surfaces of one of the enclosure and the structural element for protecting the solid fuel core from moisture or contaminants.

45. A fuel cartridge comprising a hydrogen-permeable enclosure, a solid fuel core that produces hydrogen via a Thermally Initiated Hydrolysis (TIH) reaction contained within the enclosure,
wherein all reagents reacting in the TIH reaction are in a solid form.

46. A fuel cell cartridge comprising:
a plurality of solid hydrogen-generation fuel cartridges, wherein each hydrogen generation fuel cartridge comprises:
- a non-gas permeable material and a hydrogen gas permeable portion suitable for separating hydrogen from other gases resent inside the fuel cartridge,
- a solid fuel core comprising a material suitable for undergoing a self-sustaining Thermally Initiated Hydrolysis (TIH) reaction upon thermal initiation wherein thermal initiation of the solid fuel core causes fuel materials completely contained with the solid fuel core to generate hydrogen gas by self-sustaining Thermally Initiated Hydrolysis (TIH) which continues until consequent decomposition of the solid fuel, and
- a heat producing initiator thermo-conductively coupled to the solid fuel core for providing said thermal initiation;

wherein each fuel cartridge is selectively initiated to generate hydrogen in response to selectively connecting the heat producing initiator to a source of energy.

47. The fuel cell cartridge of claim 46 wherein the solid fuel core comprises one of a powder and granules which are one of bonded and compressed.

48. The fuel cell cartridge of claim 46 wherein the solid fuel core comprises one of a single pellet and a plurality of pellets.

49. A method of fabricating a fuel cartridge for a fuel cell of an electrochemical electrical system, the method comprising:
providing a pre-determined amount of a solid fuel producing hydrogen via a Thermally Initiated Hydrolysis (TIH) reaction; and
at least partially encapsulating the fuel within an enclosure fabricated from a hydrogen-permeable material resistant to the TIH reaction;
wherein said solid fuel core comprises an intimate mixture of all chemical reagents necessary to undergo TIH prior to said encapsulation.

50. The method of claim 49, wherein the intimate mixture is provided in a bonded/compressed powder form, a granular form, a single/multiple pellet form, or a combination thereof.

51. The method of claim 49, further comprising:
fabricating the enclosure or portions thereof from a ceramic, a glass, a vermiculite coated fiberglass, a polymer, a plastic, a metal, or a combination thereof.

52. The method of claim 49, wherein the fuel comprises (i) boron hydrides, ionic hydride salts, aluminum hydrides, or a combination thereof, and (ii) carbohydrates, allylic alcohols, polymers, hydrated salts, bicarbonate salts, hydroxide compounds including lithium hydroxide, boron hydroxide, and aluminum hydroxide, or a combination thereof.

53. The method of claim 49, further comprising:
fabricating in the enclosure a plurality of chambers for the fuel, said chambers separated from one another by internal sidewalls of the enclosure.

54. The method of claim 49, further comprising:
aggregating a plurality of the fuel cartridges together using at least one structural element.

55. The method of claim 49, further comprising:
providing the fuel cartridge with components protecting the fuel from moisture or contaminants.

* * * * *